(12) United States Patent
Robinson

(10) Patent No.: US 7,036,657 B1
(45) Date of Patent: May 2, 2006

(54) CONVEYOR CHAIN

(76) Inventor: Christopher J. Robinson, 1471 Valle Vista, No. 16, Pekin, IL (US) 61554

( * ) Notice: Subject to any disclaimer, the term of this patent is extended or adjusted under 35 U.S.C. 154(b) by 0 days.

(21) Appl. No.: 11/059,996

(22) Filed: Feb. 17, 2005

Related U.S. Application Data

(60) Provisional application No. 60/545,075, filed on Feb. 17, 2004.

(51) Int. Cl.
*B65G 19/24* (2006.01)

(52) U.S. Cl. .................. 198/731; 198/728; 198/734

(58) Field of Classification Search ............... 198/731, 198/728, 734, 850, 851, 852
See application file for complete search history.

(56) References Cited

U.S. PATENT DOCUMENTS

| | | | | |
|---|---|---|---|---|
| 2,667,263 A | * | 1/1954 | Bigler et al. .............. | 198/733 |
| 2,761,548 A | * | 9/1956 | Long ...................... | 198/733 |
| 2,779,454 A | * | 1/1957 | Sigardson ................. | 198/733 |
| 3,103,275 A | * | 9/1963 | Rollins .................... | 198/733 |
| 3,225,897 A | * | 12/1965 | Rollins .................... | 198/734 |
| 4,113,084 A | * | 9/1978 | Temme .................... | 198/731 |
| 4,238,028 A | * | 12/1980 | Lake ...................... | 198/731 |
| 4,573,568 A | * | 3/1986 | Maag et al. ............... | 198/731 |
| 4,756,404 A | * | 7/1988 | Maag et al. ............... | 198/731 |
| 4,766,995 A | * | 8/1988 | Sterwerf, Jr. .............. | 198/733 |
| 6,073,752 A | * | 6/2000 | Meya ...................... | 198/731 |
| 6,571,936 B1 | * | 6/2003 | Melhuish et al. ........... | 198/731 |

* cited by examiner

*Primary Examiner*—Douglas Hess
(74) *Attorney, Agent, or Firm*—Philip L. Bateman

(57) ABSTRACT

A steel conveyor chain link having a polymeric flight is produced by obtaining a flightless steel conveyor chain link, obtaining a threaded stud, obtaining a polymeric flight having a mounting base, positioning the threaded stud against the link in a latitudinal orientation, welding the threaded stud onto the link, and fastening mounting base of the polymeric flight onto the stud.

2 Claims, 2 Drawing Sheets

CONVEYOR CHAIN

CROSS-REFERENCE TO RELATED APPLICATION

This application claims the benefit of U.S. Provisional Application Ser. No. 60/545,075, Feb. 17, 2004.

FIELD OF THE INVENTION

This invention relates to the movement of bulk and granular materials. More particularly, this invention relates to conveyor chains for moving such materials.

BACKGROUND OF THE INVENTION

Conveyors are continuous moving belts that transport bulk and granular materials from one place to another. In some types of conveyors, the material travels on the belt itself. In other types of conveyors, buckets or flights are attached to the moving belt. An example of the latter type is a conveyor chain in which the belt is formed of multiple chain links, some or all of which contain flights. As the conveyor chain moves along inside an enclosed duct, the flights pull a cross-section of material along with it. Two links of a conventional fork link conveyor chain are shown in FIG. 1. The direction of travel of the conveyor chain is from right to left. Each link consists of a longitudinal portion with a leading end (commonly known as the head) that contains a opening and a trailing end that contains a bracket. The leading edge of one link fits within the bracket of the link ahead of it. The two links are secured together with a pin or other suitable fastener. Each link contains two opposed flights that are perpendicular to the longitudinal portion. Conveyor chain links are typically made of hardened steel.

As the conveyor chain travels along the duct, sparks are sometimes created from the metal-to-metal contact between the flights and the floor of the duct. In the grain industry, sparks can ignite grain dust explosions. Awareness of the danger of grain dust explosions ignited by conveyor chains has increased in the last few years. As a result, the grain industry has taken various steps to modify conveyor chains to reduce the chances of sparks.

A first modification has been to use links that are made totally of a polymeric material. Contact between the polymeric material and the metal ductwork does not cause sparks. For example, GEFA Ltd. of the United Kingdom produces GEFLEX acetal copolymer links. Unfortunately, the polymeric links are much more expensive than steel links and they are not nearly as strong. Furthermore, the flights wear much more rapidly than steel flights. When the flights are worn, the entire link must be replaced.

A second modification is to use steel links having a polymeric paddle attached onto a metal flight as shown in FIG. 2. When the polymeric paddle becomes worn, only the paddle itself needs to be replaced. John King Chains Company of the United Kingdom produces fork links having polymeric flights. However, worn polymeric paddles do not always get replaced when needed. As a result, the metal flight can become exposed and the danger of sparks again becomes present.

A third modification is to use steel links whose flights are made completely of a polymeric material as shown in FIG. 3. This modification retains the strength and durability of the steel links while reducing the danger of sparks caused by metal flights contacting the ductwork. Holes are drilled completely through the links. Polymeric flights having a base with mounting holes are then attached to the steel links with fasteners that pass through the flights and the link. The polymeric flights are easily replaced when worn. Unfortunately, drilling holes through hardened steel links is a slow and expensive procedure.

Accordingly, a demand exists for an improved method of producing steel conveyor chains having polymeric flights.

SUMMARY OF THE INVENTION

The general object of this invention is to provide an improved method of producing a steel conveyor chain link having a polymeric flight.

I have invented an improved method of producing a steel conveyor chain link having a polymeric flight. The method comprises: (a) obtaining a flightless steel conveyor chain link; (b) obtaining a threaded stud; (c) obtaining a polymeric flight having a mounting base; (d) positioning the threaded stud against the link in a latitudinal orientation; (e) welding the threaded stud onto the link; and (f) fastening the mounting base of the polymeric flight onto the stud.

The method of this invention produces a steel conveyor chain link having a polymeric flight in a manner that is faster and less expensive than current methods.

DETAILED DESCRIPTION OF THE INVENTION

Figure 2:
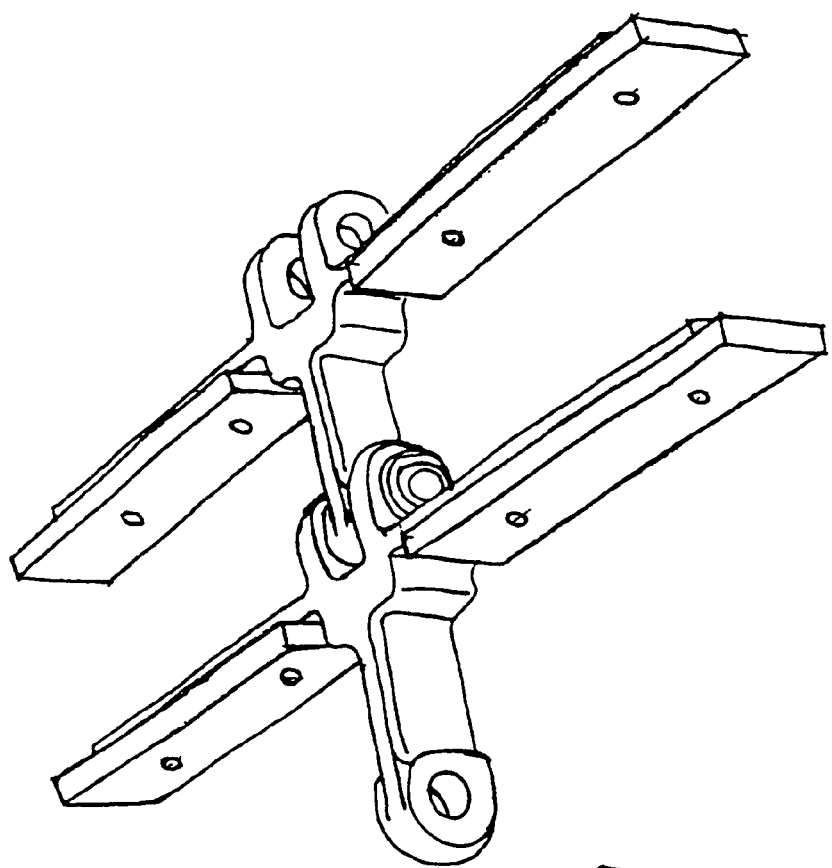
FIG. 2 is a perspective view of a second prior art conveyor chain link.
Figure 1:
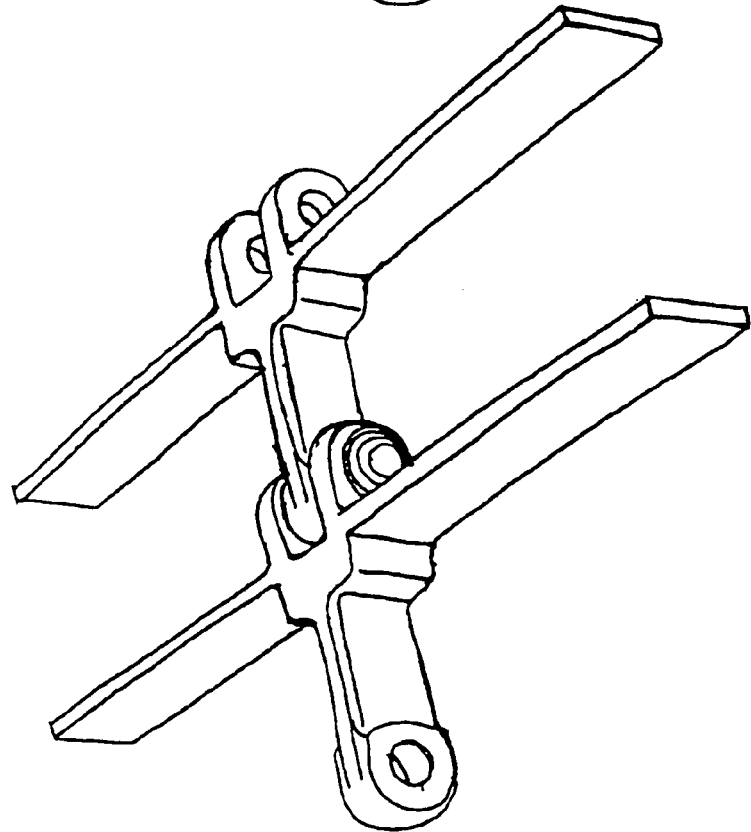
FIG. 1 is a perspective view of a first prior art conveyor chain link.
Figure 4:
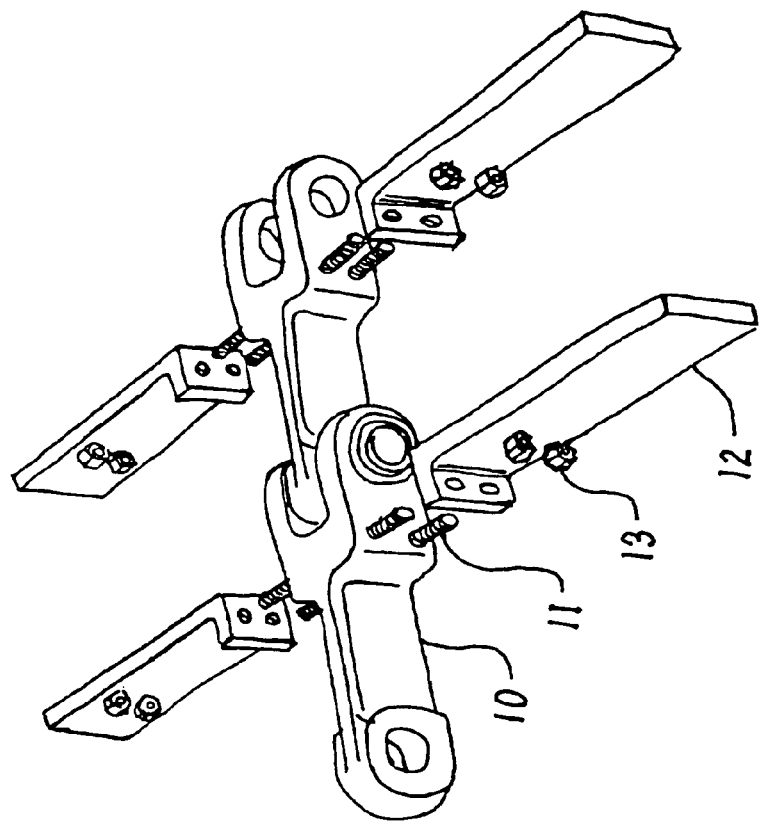
FIG. 4 is perspective view of a conveyor chain link of this invention.

This invention is best understood by reference to the drawings. Two steel conveyor chain links 10 that have no flights are shown in FIG. 4. The links shown are of the fork link type. Other types of chains, including double strands, combination strands, and the like, are equally suitable.

Welded to each side of each link are two threaded studs 11. The studs are readily available articles of commerce. They are made of steel and generally have a length of about one inch and a diameter of about three-eighths inch. They are oriented in a latitudinal direction, perpendicular to the direction of travel of the chain. The studs on each side are preferably positioned in the same vertical plane, in other words, one is mounted directly above the other. Three or more studs can be welded to each side, but the additional studs add to the cost.

The studs are preferably welded to the link using the conventional stud welding process in which opposing electrical charges are created on the link and the stud. When the stud is brought into contact with the link, the electrical current melts flux at the base of the stud, creating a very strong joint. Stud welding is a widely practiced and relatively inexpensive industrial process. Two studs are typically welded on each side of the link to prevent the flight from twisting.

Figure 3:
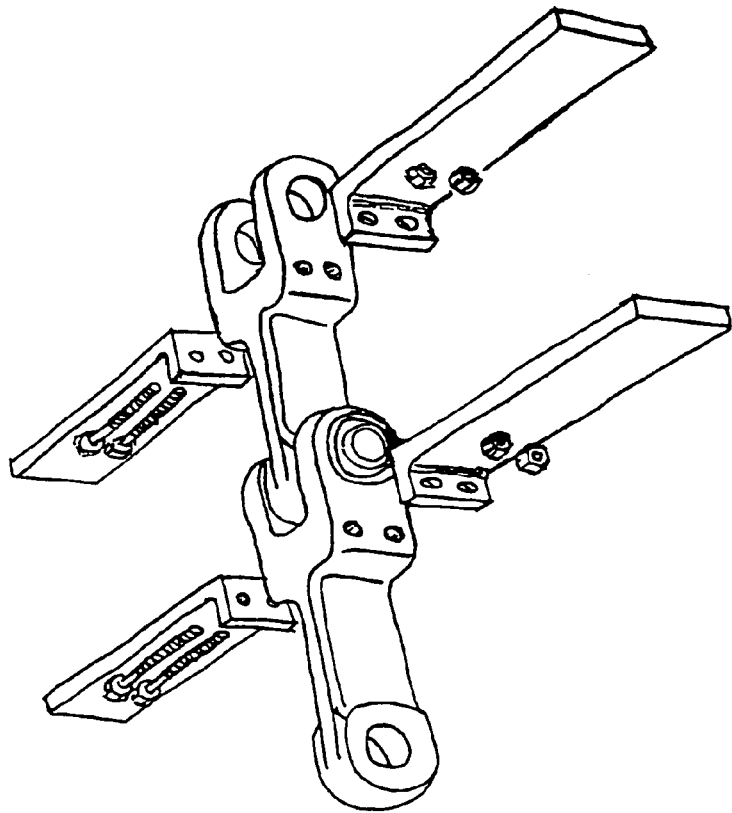
FIG. 3 is perspective view of a third prior art conveyor chain link.

Polymeric flights 12 having mounting bases with holes corresponding to the studs are then placed over the studs and fastened with nuts 13. The polymeric flights shown in FIG. 3 are available commercially and are suitable for use in this invention. Suitable polymers for the flights include nylon, acetal copolymers, high density polyethylene, and the like. This method of producing steel conveyor chain links having polymeric flights is much faster and less expensive than conventional methods.

The steel conveyor chain links of this invention retain the strength and durability of steel links while eliminating the danger of sparks caused by metal flights contacting the ductwork.

I claim:

1. A method of producing a steel conveyor chain link having a polymeric flight, the method comprising:

(a) obtaining a flightless steel conveyor chain link;
(b) obtaining a threaded stud;
(c) obtaining a polymeric flight having a mounting base;
(d) positioning the threaded stud against the link in a latitudinal orientation;
(e) welding the threaded stud onto the link; and
(f) fastening the mounting base of the polymeric flight onto the stud.

2. A steel conveyor chain link having a polymeric flight produced by the method of claim 1.

* * * * *